United States Patent [19]

Heuts et al.

[11] Patent Number: 4,699,856

[45] Date of Patent: Oct. 13, 1987

[54] ELECTROCHEMICAL CELL

[75] Inventors: Jacobus J. F. G. Heuts; Johannes J. G. S. A. Willems, both of Eindhoven, Netherlands

[73] Assignee: U.S. Philips Corporation, New York, N.Y.

[21] Appl. No.: 932,056

[22] Filed: Nov. 18, 1986

[30] Foreign Application Priority Data

Jun. 26, 1986 [NL] Netherlands .......................... 8601674

[51] Int. Cl.4 .............................................. H01M 4/36
[52] U.S. Cl. .................................. 429/218; 252/182.1; 423/647
[58] Field of Search ................... 429/218, 40, 224, 60, 429/220, 221, 223; 420/900, 455; 423/644, 647; 252/182.1, 518, 519, 520, 521

[56] References Cited

U.S. PATENT DOCUMENTS

| 3,669,745 | 6/1972 | Beccu | 429/218 X |
| 4,107,405 | 8/1978 | Percheron et al. | 429/218 |
| 4,214,043 | 7/1980 | Van Deutekom | 429/27 |
| 4,312,928 | 1/1982 | Van Deutekom | 429/27 |
| 4,487,817 | 12/1984 | Willems et al. | 429/27 |
| 4,554,152 | 11/1985 | Bogdanovic | 420/900 X |
| 4,609,599 | 9/1986 | Percheron et al. | 429/218 |

Primary Examiner—Anthony Skapars
Attorney, Agent, or Firm—Norman N. Spain

[57] ABSTRACT

The invention relates to an electrochemical cell having a negative electrode of a stable hydride-forming material, in which a high power density at a low temperature and a rapid activation (as a function of the number of charge and discharge cycles) are obtained by adding to the electrochemically active material one or more metals selected from the group formed by Ni, Pd, Pt, Ir and Rh.

The activating metal may be added to the bulk of the hydride-forming material or may be provided by substituting it for less noble metals at the surface of the powdered material.

4 Claims, 1 Drawing Figure

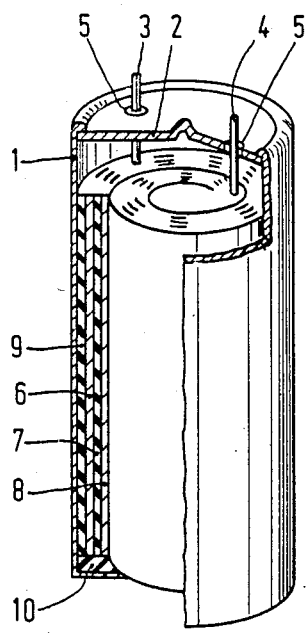

ELECTROCHEMICAL CELL

The invention relates to an electrochemical cell comprising a negative electrode, the electrochemically active material of which consists of an intermetallic compound forming a hydride with hydrogen, which compound has the $CaCu_5$-structure and the compositional formula $AB_mC_n$, where $m+n$ is between 4.8 and 5.4, where n is between 0.05 and 0.6, in which A consists of Mischmetall or of one or more elements selected from the group consisting of Y, Ti, Hf, Zr, Ca, Th, La and the remaining rare earth metals, in which the total atomic quantities of the elements Y, Ti, Hf and Zr may not be more than 40% of A, in which B consists of two or more elements selected from the group formed by Ni, Co, Cu, Fe and Mn, where the maximum atomic quantity per gram atom of A is for Ni: 3.5, for Co: 3.5, for Cu: 3.5, for Fe: 2.0 and for Mn: 1.0, and in which C consists of one or more elements selected from the group formed by Al, Cr and Si in the indicated atomic quantities: Al: 0.05–0.6, Cr: 0.05–0.5 and Si: 0.05–0.5.

The cell may be in open communication with the atmosphere or may be sealed from the atmosphere. A cell sealed from the atmosphere may have a valve which is proportioned so as to become operative at a previously fixed pressure.

In a rechargeable cell of the closed type the electrochemically active part of the positive electrode consists, for example, of nickel hydroxide, silver oxide or manganese oxide, nickel hydroxide being generally preferred for practical reasons.

In the cell an electrolyte is used which generally consists of an aqueous solution of one or more alkali metal hydroxides, such as lithium hydroxide, sodium hydroxide and potassium hydroxide, having a pH exceeding 7.

The cell may furthermore comprise a separator which separates the electrodes electrically but permits transport of ions and gas. The separator may consist of synthetic resin fibres (which may or may not be woven), for example of polyamide fibres or polypropylene fibres.

Such an electrochemical cell is described in U.S. Pat. No. 4,487,817. In said Patent Specification the electrochemically active material of the negative electrode is selected so as to be very resistant to corrosion, thereby limiting the deterioration of the electrochemical capacity of the cell to the largest extent possible.

A disadvantage of the electrochemical cell as described in said U.S. patent specification is that in the first charge and discharge cycle the capacity of the cell is below the maximum capacity and that during the first 20 to 30 charge and discharge cycles the capacity increases only gradually to its maximum value. This phenomenon is called "activation".

A further disadvantage of the known electrochemical cell is the relatively low power density of the cell and at a low operational temperature, for example below 0° C. The expression "power density" is to be understood to mean herein the capacity of the cell at high discharge rates. Both properties previously described reduce the usefulness of the stable hydride-forming materials as described in said U.S. patent specification.

It is an object of the invention to provide an electrochemical cell which can be activated rapidly, i.e. a cell which attains its maximum capacity after only a small number of charge and discharge cycles.

A further object of the invention is to provide an electrochemical cell having a high power density at low operational temperatures.

This object is achieved in accordance with the invention by an electrochemical cell as described in the opening paragraph, which cell is further characterized in that the electrochemically active material additionally comprises one or more metals selected from the group formed by Ni, Pd, Pt, Ir and Rh, the atomic quantity per gram atom of A being from 0.001 to 0.5.

The invention is based on the recognition that the high chemical activity of hydrogen at the metals Pd, Pt, Ir and Rh, which is about a factor of 100 higher than, for example, at Ni, where the activity is again nearly an order of magnitude higher than at Co, can be used in the electrochemically active material of a negative hydride electrode in order to increase the capacity after a small number of charge and discharge cycles and at low temperatures.

In a preferred embodiment of the electrochemical cell in accordance with the invention, which cell has a high power density in particular at low operational temperatures, the intermetallic compound comprises an atomic quantity from 0.2 to 0.5 per gram atom of A of the metals selected from the group formed by Pd, Pt, Ir and Rh.

The intermetallic compound may be supplemented with the above-mentioned metals. It is alternatively possible to substitute part of, for example, the quantity of Ni or Co in the intermetallic compound.

A very advantageous embodiment of the electrochemical cell in accordance with the invention, in which an electrochemically active material in the form of grains is used, is characterized in that at the surface of the grains there is a layer which comprises one or more of the metals selected from the group formed by Pd, Pt, Ir and Rh, in a quantity which corresponds to at least half a monolayer of metal atoms.

The metal atoms may be provided by exchanging them with a part of the less noble metals of the intermetallic compound, for example La. The noble metal atoms do not necessarily form a separate continuous layer. The metal atoms may also be provided on the surface of the grains by electrodeposition or by means of electroless plating, by reduction using hydrogen or by decomposition of an organometallic compound, for example, as described in U.S. Pat. No. 4,554,152.

In an alternative embodiment of the electrochemical cell according to the invention, in which an additional amount of Ni is used in the electrochemically active material of the negative hydride electrode, the additional amount of Ni is present as a separate, finely-dispersed phase, the maximum atomic quantity of Ni per gram atom of A is 3.5, and the total of $m+n$ and the additional atomic quantity of Ni per gram atom of A lies between 5.0 and 5.5.

The presence of a finely-dispersed phase of Ni increases the chemical activity of hydrogen as compared to the intermetallic compound that is capable of forming a hydride with hydrogen and thereby acts to accelarate the activation process and to increase the power density at low temperatures.

The invention will be described in greater detail with reference to examples of embodiments and an example for comparison, and with reference to a drawing in which the sole FIGURE is a partial sectional view and a partial elevation of a closed rechargeable electrochemical cell in accordance with the invention.

Example of a rechargeable cell construction

A cell sealed from the air as shown in the FIGURE is formed of a suitable housing 1 of metal, for example stainless steel, having a cover 2 comprising apertures for the conductors 3 and 4. The conductors are insulated from the metal housing (1,2) by means of rings 5 of synthetic resin. The outside diameter of the housing may be, for example, 22 mm and its height 41 mm. Inside the housing a roll of a negative electrode 6, a separator 7 and a positive electrode 8 are provided, while the assembly is surrounded by an electrically insulating foil 9 of synthetic resin, for example polyvinyl chloride, and is supported by a disc 10 of an electrically insulating material, for example polyvinyl chloride.

The negative electrode 6 consists of a hydride-forming intermetallic compound, as previously described, and is connected to the conductor 3. The negative electrode 6 is manufactured by fusing suitable quantities of the relevant elements, pulverising the intermetallic compound thus formed and applying it to a nickel carrier, for example, by means of a polymeric binder material, such as polyvinyl alcohol.

The positive electrode 8 is a nickel hydroxide electrode of the conventional sintered type which is connected to the conductor 4. A 6N potassium hydroxide solution in water is used as an electrolyte. The electrolyte is absorbed in the separator 7 and is in wetting contact with the electrochemically active material of the two electrodes. The separator 7 consists of a non-woven membrane of polyamide fibres.

The free gas space in the cell is approximately 5 cm$^3$. A closed cell of this type has an EMF between 1.2 and 1.4 V. The cells according to the invention can be combined in a conventional manner to form batteries comprising, for example, several series-arranged cells.

Example for comparison, not according to the invention

An electrochemically active material for the negative electrode, having the composition $La_{0.8}Nd_{0.2}Ni_{2.5}Co_{2.4}Si_{0.1}$, is prepared by mixing the required quantities of the various components, and subsequently fusing and pulverising them by repeated hydrogen adsorption and desorption. A electrode is then made and accommodated in a cell, for example as previously described.

The power density of the negative electrode is determined at 2520 C. by measuring the storage capacity of the cell in charge and discharge cycles at a rate of 2.0 C, that is to say the charge and discharge speed is such that 2.0 times the nominal capacity of the cell would be supplied to or withdrawn from the cell in 1 hour. The nominal capacity of a cell is the capacity at a low charge and discharge rate, measured before the capacity of the cell deteriorates, for example, due to corrosion.

After 10 charge and discharge cycles the capacity is 30% of the maximum capacity, after 20 cycles it is 90%, after 30 cycles it is 100% and after 300 cycles it is 95%.

After a great number of cycles the power density at 0° C. is only 50% of the power density at 25° C. If the discharge rate is raised to 4.5 C, the power density at 0° C. is no more than 30% of the capacity at 25° C.

EXAMPLE 1

An electrochemical cell is manufactured as previously described using an electrochemically active material for the negative electrode, having the composition $La_{0.8}Nd_{0.2}Ni_{2.5}Co_{2.0}Pd_{0.4}Si_{0.1}$. In order to obtain a sufficiently high power density at a low temperature the amount of Pd is more than 0.2 units in the compositional formula. Preferably, the amount of Pd does not exceed 0.5 units because a larger amount of Pd does not lead to a further improvement.

After 1 charge and discharge cycle the power density at 25° C. is 95% and after 2 cycles it is 100% of the maximum value. The power density does not deteriorate when the discharge rate is raised to 4.5 C. When, in addition, the temperature is lowered to 0° C. the power density does not noticeably deteriorate (in more than 100 cycles).

EXAMPLE 2

An electrochemically active material of the composition $La_{0.8}Nd_{0.2}Ni_{2.5}Co_{2.4}Si_{0.1}$ is prepared and pulverised as previously described. Next, 10 g of the powder is mixed with 22 ml of a solution in water containing 0.5 g/l of $PdCl_2$ and 3.8 g/l of KCl for about half a minute, in which process the solution decolourizes due to the exchange of Pd ions from the solution with less noble atoms from the surface of the powder, in particular La. The powder is then filtrated and used in an electrochemical cell.

The negative electrode exhibits a high power density after a small number of cycles and also at 0° C. Thus, the presence of the catalytically active Pd atoms at the surface of the grains is sufficient to obtain the desired effect in accordance with the invention.

The powdered material has a surface area of 0.25 m$^2$/g. In accordance with the previously described method, an amount of Pd is provided which corresponds approximately to a monolayer of Pd atoms on the surface. Expressed in gram-atoms of A and averaged over the total amount of the intermetallic compound, the atomic amount of Pd is approximately 0.002, thereby attaining a considerable reduction of the amount of Pd necessary with respect to the first example.

EXAMPLE 3

An electrochemically active material of the overall composition $La_{0.8}Nd_{0.2}Ni_{3.0}Co_{2.4}Si_{0.1}$ is prepared and pulverized as previously described, with the additional steps that after fusing of the components, the material is quenched to room temperature and subsequently treated at a temperature of 900° C. for one hour in an argon atmosphere or in vacuum. During this heat treatment, a separate, finely-dispersed phase of nickel is formed. The dispersion may be made even finer if the temperature during the heat treatment is lower, for example as low as 500° C.

A cell which is constructed from this material has a power density at 0° C. which is more than 60% of the power density at 25° C.

After 5 charge and discharge cycles the power density at 25° C. is 90% of the maximum value, after 10 cycles it is 95% and after 15 cycles it is 100%.

What is claimed is:

1. An electrochemical cell comprising a negative electrode, the electrochemically active material of which consists of an intermetallic compound forming a hydride with hydrogen, which compound has the $CaCu_5$-structure and the compositional formula $AB_mC_n$, where m+n is between 4.8 and 5.4, where n is between 0.05 and 0.6, in which A consists of Mischmetall or of one or more elements selected from the group consisting of Y, Ti, Hf, Zr, Ca, Th, La and the remaining rare earth metals, in which the total atomic quantities of the elements Y, Ti, Hf and Zr may not be more than 40% of A, in which B consists of two or more elements selected from the group formed by Ni, Co, Cu, Fe and Mn, where the maximum atomic quantity per gram atom of A is for Ni: 3.5, for Co: 3.5, for Cu: 3.5, for Fe: 2.0 and for Mn: 1.0, and in which C consists of one or more elements selected from the group formed by Al, Cr and Si in the indicated atomic quantities: Al: 0.05-0.6, Cr: 0.05-0.5 and Si: 0.05-0.5, characterized in that the electrochemically active material additionally comprises one or more metals selected from the group formed by Pd, Pt, Ir and Rh, the atomic quantity per gram atom of A being from 0.001 to 0.5.

2. An electrochemical cell as claimed in claim 1, characterized in that the intermetallic compound comprises an atomic quantity from 0.2 to 0.5 per gram atom of A of the metals selected from the group formed by Pd, Pt, Ir and Rh.

3. An electrochemical cell as claimed in claim 1, in which an electrochemically active material in the form of grains is used, characterized in that at the surface of the grains there is a layer which comprises one or more of the metals selected from the group formed by Pd, Pt, Ir and Rh, in an quantity which corresponds to at least half a monolayer of metal atoms.

4. An electrochemical cell as claimed in claim 1, in which an additional amount of Ni is used in the electochemically active material of the negative hydride electrode, characterized in that the additional amount of Ni is present as a separate, finely-dispersed phase, the maximum atomic quantity of Ni per gram atom of A is 3.5, and the total of m+n and the additional atomic quantity of Ni per gram atom of A lies between 5.0 and 5.5.

* * * * *